United States Patent [19]

Woods et al.

[11] Patent Number: 4,709,355
[45] Date of Patent: Nov. 24, 1987

[54] CONTROLLER FOR MARINE SEISMIC CABLE

[75] Inventors: Theodore E. Woods, Stafford; Jimmy R. Cole, Houston; James T. Burcham, Sugar Land, all of Tex.

[73] Assignee: Syntron, Inc., Houston, Tex.

[21] Appl. No.: 621,492

[22] Filed: Jun. 18, 1984

[51] Int. Cl.⁴ .............................................. G01V 1/38
[52] U.S. Cl. ..................................... 367/16; 114/245
[58] Field of Search ................................. 367/16–18, 367/19, 45, 130; 114/331, 245

[56] References Cited

U.S. PATENT DOCUMENTS 3,680,520  8/1972  Smith .................................. 367/18 X

FOREIGN PATENT DOCUMENTS

2137346  10/1984  United Kingdom .................. 367/19

Primary Examiner—Thomas H. Tarcza
Assistant Examiner—Mark Hellner
Attorney, Agent, or Firm—Arnold, White & Durkee

[57] ABSTRACT

Disclosed is a cable leveling device for a seismic marine cable. The cable leveling device features a motor which controls diving planes by way of direct mechanical linkage. The motor is controlled by a stored program digital processor connected in a closed loop feedback circuit. Optical reflective sensors are employed in the feedback loop to monitor the position of the mechanical linkage to directly determine the angle of the diving planes. A telemetry unit is provided to telemeter data from the cable leveling device to shipboard via the marine cable.

11 Claims, 16 Drawing Figures

CONTROLLER FOR MARINE SEISMIC CABLE

REFERENCES TO RELATED PENDING APPLICATIONS

Patent application Ser. No. 501,809, filed June 7, 1983, in the name of Theodore E. Woods and entitled "Cable Position Monitoring" (hereafter the "Cable Compass Application") relates to a position monitor for a marine cable. The Cable Compass Application is hereby incorporated by reference.

BACKGROUND OF THE INVENTION

The present invention relates in general to method and apparatus for controlling the depth of marine cables, and in particular to such depth controllers which are remotely controlled electronically from the ship which tows the cable.

Remote controlled seismic cable depth controllers have in the past been of two general types or categories.

A first type, such as in U.S. Pat. Nos. 3,412,704; 3,541,989; and 3,605,674, has been based on controlling the depth of depth controllers or paravanes disposed at spaced positions on the cables by means of signals sent from transmitters mounted in the seismic cable near each controller to receivers in the controllers. Components of the controller adjusted the depth of the cable in response to the signals received at the receiver. These types of apparatus thus required a special cable for remote control seismic surveying, containing transmitters at spaced locations therein. Since typical seismic cables for survey operations may reach one or two miles in length, it was undesirable for economic reasons to require a special cable, different from that normally used, for remote control seismic surveying.

A second type of cable depth controller has used signal responsive sensors in the depth controller to receive signals sent through a conductor in the cable (as in U.S. Pat. Nos. 3,648,642 and 3,673,556) or through the water (as in U.S. Pat. No. 3,412,704). However, the number of depths to which the controllers could be raised or lowered oftentimes depended on the number of frequencies used. As the number of frequencies increased, the number of frequency-sensitive filters or frequency-sensitive relays in the controllers increased. The sensitivity of the frequency-sensitive members had to increase, so far as is known, if several frequencies were attempted for several different depths. Also, since analog signals often were used with cycles of frequency specifying the desired depth, and these frequencies could drift, this type of depth controller could deviate from the desired depth setting and affect cable depth.

Another type of cable depth controller employing a conductor in the cable has featured a digital control signal sent down the conductor. The digital control signal representing the desired operating depth of the cable was received by the depth controller and stored in a shift register. The depth control signal was compared with an encoded signal representing the present setting of a motor which controlled the compressive force exerted by a spring on a piston exposed to ambient water pressure at the actual operating depth of the seismic cable. Differences between the water pressure and spring pressure causes adjustment of the angle of the diving planes on the depth controller. This type of system is set forth in U.S. Pat. No. 4,290,124, assigned to the assignee of the present invention. While this cable depth controller has provided superior results, it lacked the capability of transmitting data back to the ship. Also, while it used a feedback control loop for maintaining depth, it lacked optimum responsiveness in maintaining the desired depth in adverse conditions.

SUMMARY OF THE INVENTION

Briefly, the present invention provides a new and improved remote control seismic cable depth controller which is responsive to digital control signal pulses sent down a conductor in the cable from an exploration boat towing the cable. The depth controller includes a stored program digital processor for controlling a motor which directly controls the angle of the diving planes of the depth controller. The stored program digital controller is connected into a feedback loop and features an adaptive algorithm which adapts its operating parameters to optimize the depth control based on past depth information, present depth information, as well as the historic incremental changes in the diving plane angle which produced the past and present depth change.

In a more particular embodiment of the invention, a hardware timer is provided to allow periodic adjustments to the diving planes. The adjustment may be either in response to commands transmitted from shipboard or in response to the feedback loop with updated information. The new shipboard commands may include a new desired depth, a new diving plane attitude, or it may include a full dive command or a full climb command.

According to another aspect of the invention, the adaptive algorithm regularly updates the instantaneous gain factor attributed to the diving plane for the closed loop calculations. Specifically, the adaptive algorithm maintains an updated gain factor according to the formula: the change in the angle of the diving plane divided by the difference in the vertical water velocities of the cable. Thus, for different cable velocities or different currents in the water, updated gain values will be calculated with respect to time. Adapting the algorithm with such updated information provides optimum efficiency in depth control.

According to another aspect of the invention, the feedback loop is optically coupled into the mechanical control system for the diving planes. The diving plane control motor rotates a shaft which by direct linkage controls the diving plane angle. Calibrations on the shaft are optically monitored and provided as input to the adaptive feedback loop.

According to another feature of the invention, the cable depth controller includes telemetry circuitry to telemeter back to the ship various positional data such as depth and diving plane angle.

It is thus a general object of the present invention to provide a new and improved marine cable depth controller which optimizes depth control; for example, by employing adaptive feedback techniques, optical coupling feedback techniques, and direct motor control of the diving plane angle.

BRIEF DESCRIPTION OF THE DRAWINGS

The above and other objects, features and advantages of the present invention will become apparent upon consideration of the following detailed description of a preferred embodiment, especially when taken in conjunction with the accompanying drawings, wherein.

DESCRIPTION OF A PREFERRED EMBODIMENT

Figure 1:
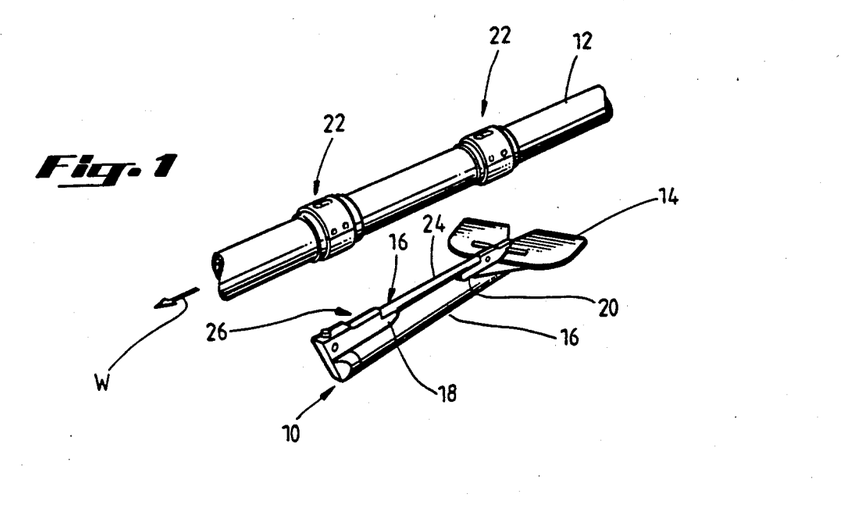
FIG. 1 is a partial isometric view of a cable leveling device according to the present invention, shown in association with a marine cable.

Referring to FIG. 1, an apparatus 10 for remotely controlling the depth of a seismic cable 12 is shown in accordance with the present invention. The cable 12 is of the conventional type, formed from polyurethane, PVC, or other suitable material. The cable 12 is towed or pulled forward through a body of water in a direction W indicated by the arrow (FIG. 1) along its longitudinal axis behind a seismic exploration vessel of the conventional type. As will be set forth below, the apparatus 10 responds to digital control signals sent down a conductor in the cable 12 and adjusts the depth of the cable 12 to a desired operating depth represented by the control signal.

Typically, the cable 12 is filled with kerosene or suitable liquid for neutral buoyancy in the body of water and contains at spaced locations therein plural seismic signal sensing hydrophones (not shown) which detect seismic signals reflected from geological formations underlying the body of water being explored. The sensing hydrophones are connected through suitable communications conductors in the cable 12 to the vessels to permit the seismic signals, or digitized versions thereof representing these geological formations to be telemetered to and recorded by suitable instruments on the ship.

Typically, the cable 12 is several thousand feet in length, and plural remote depth control apparatus 10 according to the present invention are mounted at suitable spaced locations on the cable 12. The cable leveling devices 10 keep the various sections of the cable 12 at substantially the same depth, an important factor for accuracy in seismic surveying.

The cable leveling device 10 includes digital circuitry to control the depth at which the cable 12 is operating by controlling the angle of dive of a pair of diving planes 14 (FIG. 1). As a feature of the invention, the angle of the diving planes 14 is controlled through the direct action of a motor drive and its related mechanical linkage to move the cable 12 to the desired depth, as will be described in detail below.

The cable leveling device 10 has a main housing tube 16 and is connected via the housing tube 16 to the cable 12 by a front support shank 18 and an aft support shank 20. The rear support shank 20 has the diving planes 14 mounted thereon. The planes 14 extend laterally therefrom transversely to the longitudinal axis 21 of the housing tube. The cable 12 has plural connecting collar assemblies 22 for attaching the support shanks 18, 20 to the cable. The connecting collar assemblies 22 may be, for example, of the type described in U.S. Pat. No. 3,931,608. The connecting collar assembly 22 preferably is as described in U.S. Pat. No. 4,290,124, which is hereby incorporated by reference.

A tubular power supply housing 24 is mounted between a front electrical socket 26 on the front support shank 18 and the rear support shank 20. The power supply housing 24 in one embodiment contains therein a suitable number of batteries to provide operating electrical power to the control module through conventional fluid-tight connections.

Figure 2:
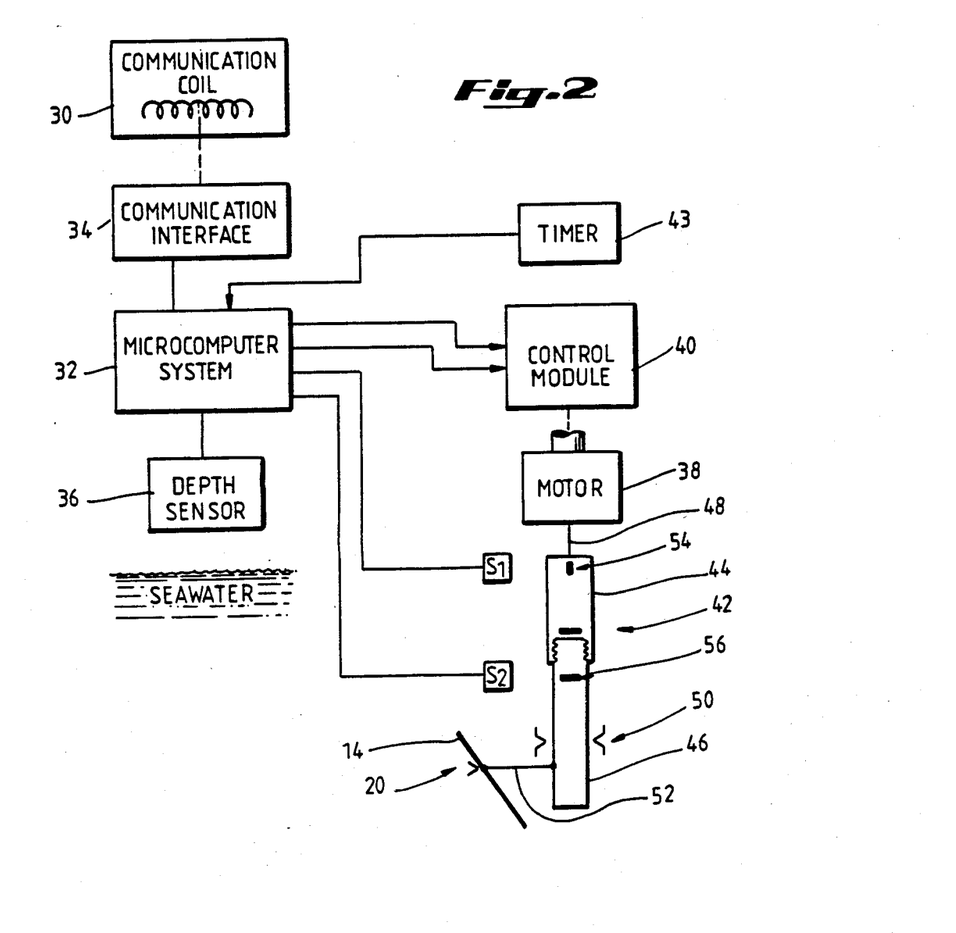
FIG. 2 is a schematic diagram of the feedback control system for the diving planes according to one aspect of the present invention.

Referring now to FIG. 2, the cable depth controller, according to the present invention, is shown generally in schematic form. A communication coil 30 is mounted inside the front shank 18. The coil 30 is preferably a ferrite rod induction coil and is identical to another communication coil (not shown) located within the cable 12 at a location adjacent the coil 30. In effect, these respective coils form the primary/secondary of a transformer to provide inductive coupling between the cable leveling device 10 and the communication system contained within the cable 12. As a feature of the invention, the communication between the coils is bidirectional, allowing the ship and the device 10 each to send to the other.

Typically the communication system contained within the cable 12 includes a conductor which provides energization to the cable coil which is matched to the coil 30. Shipboard electronics energizes the cable coil in accordance with any known data transmission/encoding scheme. In a preferred embodiment the data transmission/encoding scheme is a phase modulated, frequency shift key (FSK) scheme, such as disclosed in the co-pending Cable Compass Application, which has been incorporated by reference. In the system of the Cable Compass Application, the center frequency is 27.7 KHz and the deviation is ±0.7 KHz. This frequency is considerably higher than the seismic passband so that it will not interfere with the seismic signals.

The cable leveling device 10 employs a microcomputer system 32 which is coupled to the communication coil 30 by a communication interface 34. The communication interface is of any known design to accommodate the transmission/reception of the particular type of data transmission/encoding scheme selected. When employing the phasemodulated, FSK transmission scheme as in the preferred embodiment, a communication interface such as shown and described in the co-pending Cable Compass Application may be employed.

The microcomputer system 32 likewise may be of any conventional type. However, preferably the microcomputer system 32 is of the low power type, such as available from OKI Semiconducter as Model 80C39.

The microcomputer system 32 is a stored program processor having an algorithm responsive to depth information from a depth sensor 36 and responsive to feedback signals indicative of the angle of the diving planes 14 with respect to the axis 21. In this regard, the cable leveling device 10 includes a motor 38, a motor control module 40 and a diving plane control assembly 42. A plurality of sensors S1, S2 are positioned adjacent the control assembly 42 for monitoring the angle of the diving plane 14. A hardware timer 43 is provided to periodically enable the computer system 32 to update the diving plane angle. In the preferred embodiment, the timer 43 interrupts the computer system 32 at a predetermined interval or at selectable intervals.

In the preferred and illustrated embodiment, the control assembly 42 includes a motor coupler 44 and a lead screw 46. The motor coupler 44 is directly connected to the armature 48 of the motor 38 and rotates with the armature 48. The lead screw 46 is threadably connected into the motor coupler 44 and maintained in a fixed rotational orientation. Thus, rotation of the motor coupler 44 causes the lead screw 46 to travel longitudinally along the axis 21 within the motor housing 50.

The diving plane 14 is coupled through the motor housing 50 to the lead screw 46 by way of a moment arm linkage 52. As the lead screw 46 translates due to rotation of the motor coupler 44, the moment arm linkage 52 causes the diving plane 14 to change its angle with respect to the aft shank 20.

The sensors S1 and S2 preferably are optical reflective sensors positioned to detect markings on the coupler 44 and lead screw 46. Suitable sensors are available from Hewlett-Packard, Inc., Model HEDS 1000. The sensors S1, S2 respectively detect position marks 54 and a limit mark 56. The position marks 54 preferably are etched or ground in the periphery of the motor coupler 44. The limit mark 56 is notched in the lead screw 46 and functions both as a calibration mark during initialization and as a limit mark during operation. Specifically, the detection of the imit mark 56 corresponds to a maximum diving plane angle providing the greatest lift to the cable 12.

Figure 4A:
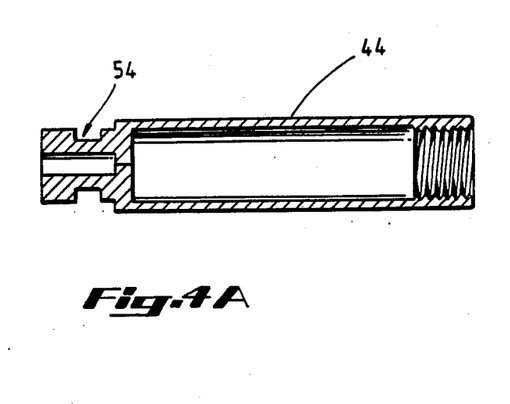
FIGS. 4A and 4B are elevational and end views of a motor coupler showing position marks which are monitored as inputs to the feedback control loop for the diving planes.
Figure 4B:
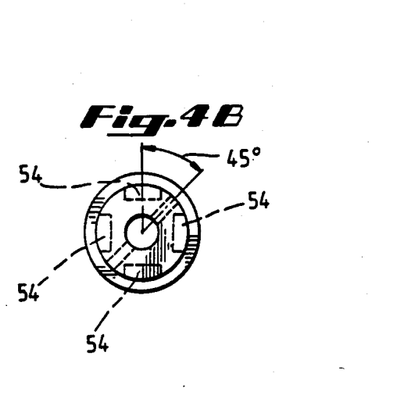

FIGS. 4A and 4B show the motor coupler 44 and the position marks 54 in detail. As seen in the preferred and illustrated embodiment, there are four position marks 54 equilaterally spaced around the periphery of the coupler 44. The marks 54 are depressions etched or milled in the coupler 44.

As seen from FIG. 2, the diving plane 14 is controlled by a feedback loop comprising the sensors S1, S2, the microcomputer system 32, the control module 40, the motor 38, and the linkage control assembly 42. According to outstanding features of the invention, the motor 38 is coupled for controlling the diving plane 14 by way of a direct drive; (2) the feedback loop is optically coupled to the control assembly 42 by way of the sensors S1, S2; and (3) the computer system 32 is programmed with an adaptive algorithm to optimize the control of the cable depth. That is, the adaptive algorithm adapts its operating parameters based on past depth information, present depth information, as well as the historic incremental changes in the diving plane angle. In connection with the adaptive algorithm, the parameters are always measured or updated so that when an adjustment becomes desirable, the most recent data will be used to calculate the change in the wing angle required. The timer 43 assures updating every 65.5 seconds, if necessary.

The algorithm updates as necessary the so-called gain of the diving plane. That is, as the horizontal water speed of the cable leveling device 10 changes, so does the vertical force producing capability of the diving plane 14. Because a change in water speed so dramatically affects the depth changing ability of the cable leveler 10, every time a significant change in velocity is made, a corresponding change in the plane angle is made. This type of correction in plane angle is due to receipt from shipboard electronics of a change in velocity. However, corrections to plane angle are also made independently of shipboard corrections due to the timer 43 and the feedback loop in maintaining the desired depth.

According to the preferred algorithm, the gain of the diving plane 14 is calculated according to the following formula:

(Previous wing counts minus present wing counts) x K/(new velocity rate minus old velocity rate)

where the velocity rates are vertical rates or changes in depth. In the preferred embodiment, the constant K is selected as 256, the depth velocities are measured in ⅛ths of a foot per 65 seconds, and wing counts are measured in 4ths of a degree.

To determine whenever a sufficiently significant change has been calculated to justify a new gain calculation, the following criterion is applied:

1. The old depth or the new depth must not be at the end of the depth range;

2. The absolute value of the new rate minus the old rate must be greater than 31 counts, or 4 feet per 65 seconds;

3. The absolute value of the new angle minus the old angle must be greater than 15 counts, or 4 degrees; and 4. The absolute value of the new depth minus the old depth must be greater than 7 counts, or 1 foot.

As a feature of the invention, the algorithm computes an average depth value, rather than an instantaneous depth value, as sensed by the depth sensor 36. This allows measured variations in depth due to swells, etc. to be averaged out. In effect, the algorithm provides a digital filter having a programmable time constant to the depth signals.

Figure 3:
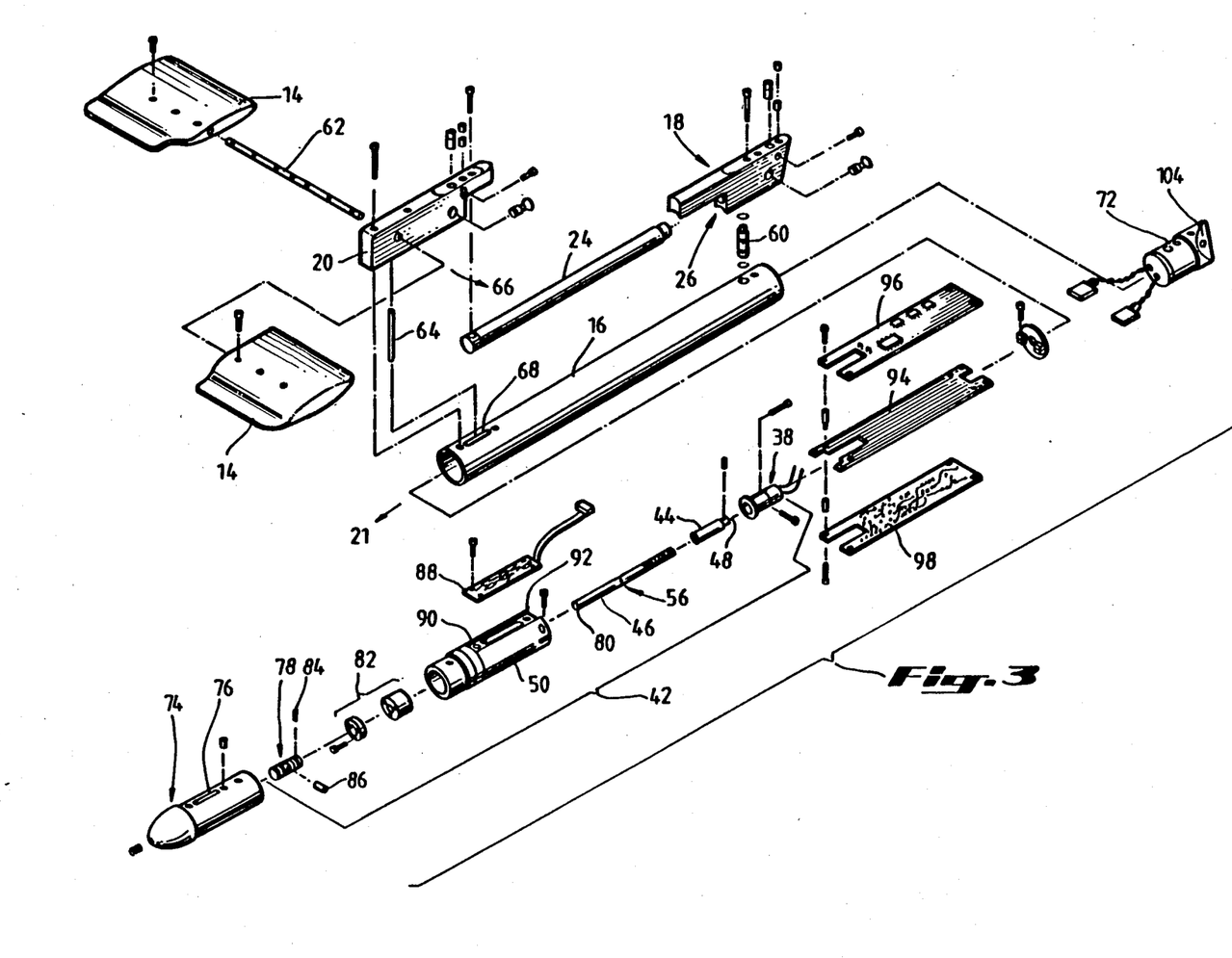
FIG. 3 is an exploded isometric view of the cable leveling device of FIG. 1.

Referring now to FIG. 3, the mechanical structure of the cable leveling device 10 is shown in exploded detail. Referring first to the outer structure which contacts the water, the housing tube 16 provides base support. The forward support shank 18 and the aft support shank 20 are directly mounted on the housing tube 16. The power supply housing 24 is mounted between the shanks 18, 20, and the forward end of the power supply housing 24 engages the front socket 26. An electrical connection 60 couples the front socket 26 and the forward end of the power supply housing 24 to a location within the housing tube 16.

The diving planes 14 are supported transversely from the aft support shank 20 and are rotatably mounted therefrom by a diving plane shaft 62. Preferably, the diving planes 14 are shaped in accordance with Specification NACA 0010. A moment shaft 64 is screwed into the diving plane shaft 62 along a radius from the axis 66 of the diving plane shaft 62. A slot (not shown) is provided in the aft shank 20, and a slot 68 is provided in the housing tube 16. Ihe slot 68 is elongated in the direction along the axis 21 of the housing tube 16. The moment arm shaft 64 extends through the slots and is allowed to move along the axis 21 to change the orientation of the diving planes 14 with respect to the aft shank 20; i.e., also with respect to the housing tube 16 and the axis 21. A nose piece 72 and a tail piece 74 are secured respectively in the forward and rearward ends of the housing tube 16. The tail piece 74 also has a slot 76 through which the moment arm shaft 64 passes for allowing movement of the shaft 64 along the axis 21.

In order to move the moment arm shaft 64 to and fro along the axis 21 in order to control the angle of the diving planes 14, the motor 38 and its associated diving plane control assembly 42 are contained within the housing tube 16.

The motor 38 is a precision, DC servo motor of any of several suitable types. As a feature of the invention, the diving plane control assembly 42 is a direct mechanical linkage between the motor 38 and the moment arm shaft 64 such that precise movement of the motor 38 similarly causes precise angular movement in the diving planes 14.

As another feature of the invention, the diving plane control assembly 42 and the motor 38 are commonly supported within the motor housing 50 which features a unitary design. Specifically, by allowing a single unitary structure to support the motor 38 and the several moveable components of the diving plane control assembly 42, not only an efficient control is achieved, but also a precise control is achieved. This precision is achieved even in the face of manufacturing tolerances necessarily involved for the several parts.

The diving plane control assembly 42 includes the motor coupler 44, the lead screw 46, and a moment arm bushing and piston 78, all of which are supported within the motor housing 50. The motor coupler 44 is directly connected to the armature shaft 48 of the motor 38. The lead screw 46 is threadably connected into the motor coupler 44 and is maintained in a generally fixed rotational orientation by virtue of the moment arm bushing and piston 78 and its interaction with the motor housing 50, as will be explained. Since the lead screw 46 is restrained from rotating, operation of the motor 38 to rotate the armature shaft 48 causes the lead screw 46 to translate to and fro along the axis 21.

As earlier explained, the lead screw 46 has milled or etched therein the limit mark 56. The longitudinal orientation of the limit mark 56 with respect to the motor housing 50 is coordinated to coincide with a maximum allowable diving plane angle. This is for the double purpose of initial calibration and for the purpose of providing a limit stop in the case of malfunction.

The end 80 of the lead screw 46 extends through the housing 50 through an appropriate sealing arrangement 82 and is pinned via a pin 84 to the moment arm bushing and piston 78. The moment arm bushing and piston 78 includes an outer bushing having a piston rotatably secured therein. Only the bushing is pinned to the end 80 of the lead screw 46, allowing the inner piston to rotate with respect to the bushing.

The tail piece 74 encloses the moment arm bushing and piston 78 and snugly slips over the end of the motor housing 50. Appropriate seals such as O-rings are provided as necessary.

The slot 76 of the tail piece is in alignment with a slot in the moment arm bushing. This allows the moment arm shaft 64 to extend through the slot 76 and to be pinned by way of a pin 86 to the moment arm piston of the assembly 78. Thus, forward and rearward translation of the lead screw 46 causes forward and rearward translation of the moment arm bushing and piston 78 which causes forward and rearward translation along the axis 21 of the moment arm shaft 64. This changes the angle of the diving planes 14.

In order to monitor movement of the lead screw 46 and motor coupler 44, the sensors S1, S2 are mounted on a sensor board 88. The sensor board 88 is mounted to the motor housing 50 over slots 90, 92 positioned to overlie travel of the limit mark 56 and the position marks 54 on the motor coupler 44. The sensors S2, S1, respectively, are positioned on the sensor board 88 to allow them to detect movement of the marks 56, 54.

Also positioned within the housing tube 16 are an insulator board 94 for supporting a digital board 96 and an analog board 98. The digital board 96 supports the microcomputer system 32 and its associated EPROM and RAM memories. The analog circuit board 98 contains the necessary analog to digital converter circuitry necessary for converting analog depth indicative signals and analog power level indicative signals to digital form for use by the microcomputer system 32.

The nose piece 72 plugs into the forward end of the housing tube 16. The nose piece supports a depth transducer connector 100 and a power signal connector 102 respectively for coupling to the analog board 98. The depth transducer connector 100 is connected to the depth sensor 36 which is mounted on the nose piece 72. A hole 104 in the nose piece 72 allows water pressure to act on the sensor 36. The power signal connector 102 is coupled to the electrical connector 60.

The overall operation of the cable leveling device 10 is explained in connection with FIGS. 5A-5I, which show the operational flow diagram for the system.

Figure 5A:
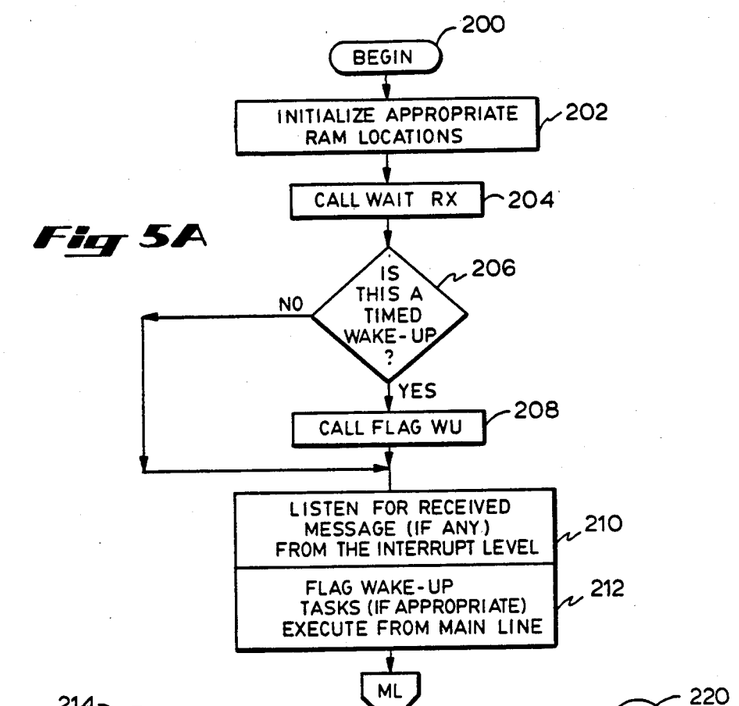
FIGS. 5A–5I are flow diagrams which define operation by the microcomputer to control the cable leveling device according to the invention; and, FIG. 6 shows a water driven generator which may be employed alternately to the battery pack shown in FIG. 1.
Figure 5B:
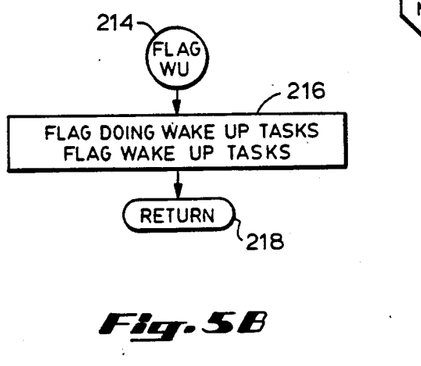
Figure 5C:
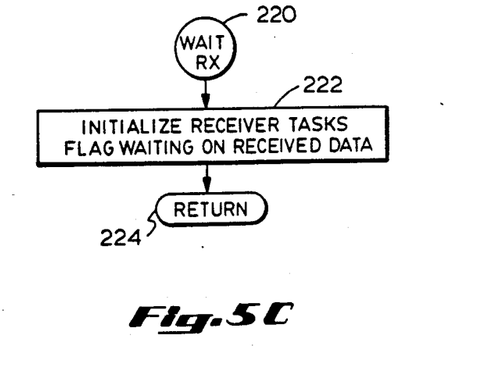

The Begin label 200 in FIG. 5A indicates that the system 20 has power applied to the microcomputer 32 and its associated circuits. After completing its functional operation, the microcomputer system 32 reduces power and retains data in its memory locations via battery back-up circuitry. Certain RAM locations will be reinitialized at the time of power up while other RAM locations will maintain their data contents from operation to operation as the processor returns to stand-by operation 202.

Subroutine WAIT RX 220 is called 204 conditioning the cable leveler 10 to wait for the reception of data from the ship to the cable 12. The receiver tasks 240 which are interrupt driven are initialized and a flag is set to indicate waiting for received data 222. Power is applied (i.e., so-called wake up) to the microcomputer 32 either on a regularly timed basis or whenever a transmitted message from the shipboard unit is received. If the wake up has been caused from the internal timer 43, then certain tasks are scheduled which must measure depth information in order to determine the vertical velocity in water. If, however, the wake up is from a received communications message from the shipboard unit, then the information required to measure the vertical velocity in water would not typically be updated at this time. If this is a timed wake up 206, then the FLAG WU subroutine 214 is called 208 which sets two flags 216. One flag, DOING THE WAKE UP TASKS, will be tested later 288 to determine whether or not it is known if the wake up task needs to be performed. The other flag, WAKE UP TASKS, tells the mainline procedure 322 whether or not to do any wake up tasks this particular wake up period. At this point, the microcomputer 10 will listen for any messages from the ship 210 at the interrupt level 240 and will flag any tasks related to a wake up 212 for the mainline to execute 322.

Figure 5D:
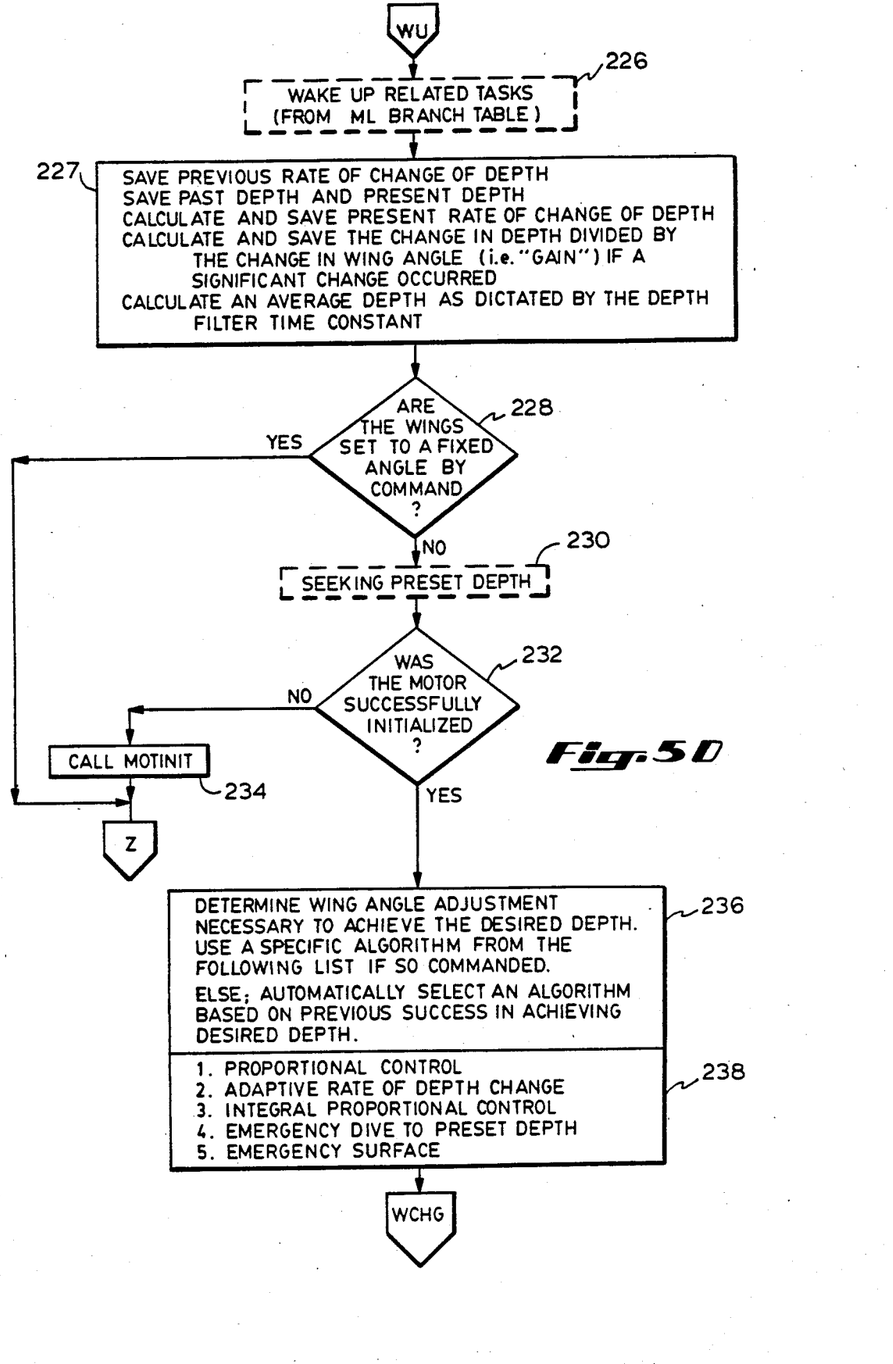
Figure 5E:
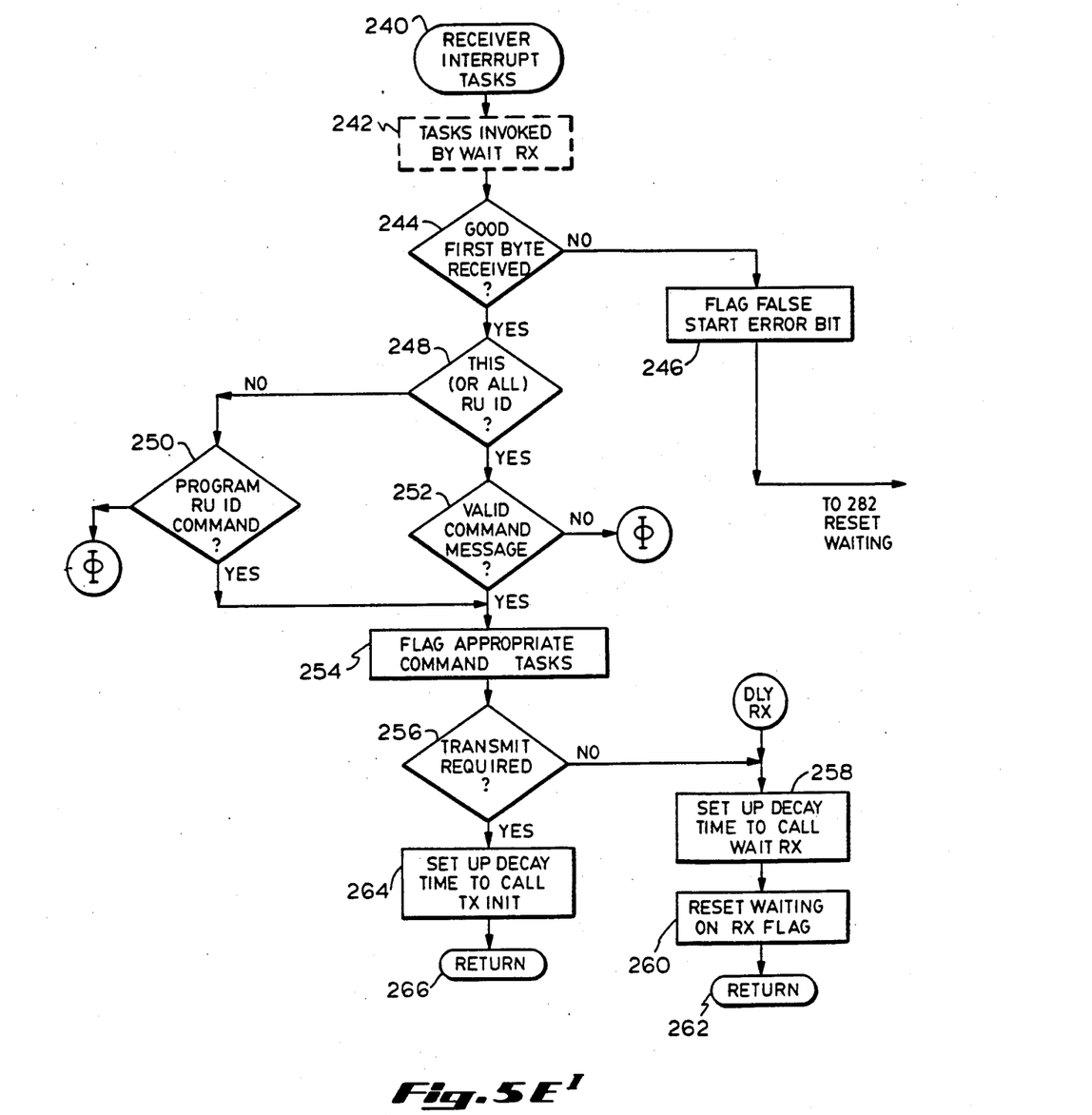
Figure 5F:
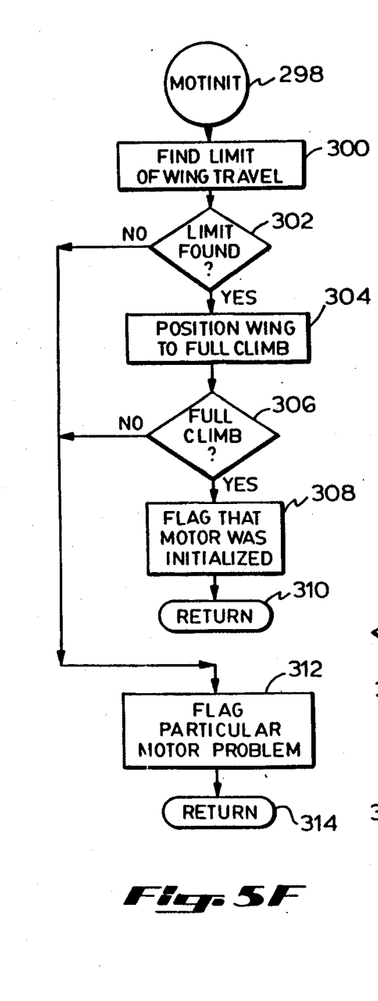
Figure 5G:
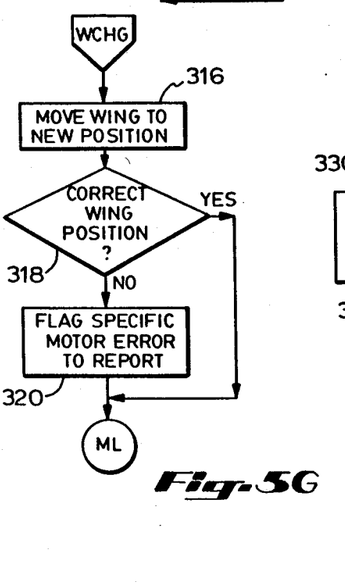
Figure 5H:
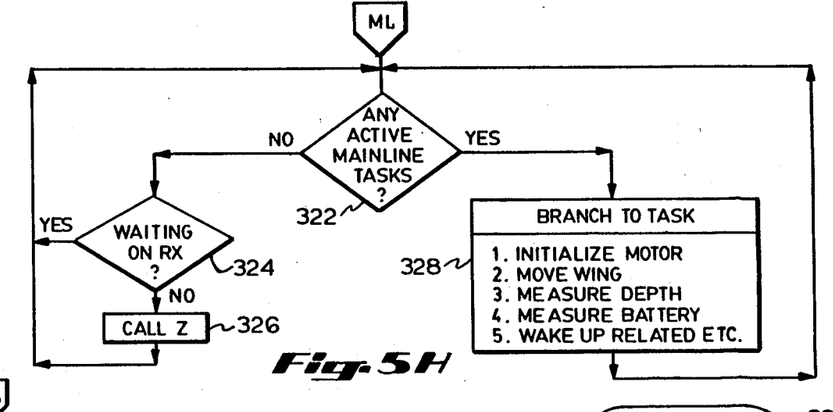

Referring to FIG. 5H, the mainline task handler will execute mainline tasks as necessary 322 so long as received messages can be expected from the ship 324. As tasks become necessary 328, each is executed and branch back to the mainline task handler 322 to look for other tasks. Once there are no further tasks and messages are no longer expected from the ship, a call is made 326 to entry point Z 286 in FIG. 5E. At this point, the microcomputer system 32 would like to go to the stand-by mode but it must be determined whether or not a wake up is present 286. This check is necessary in those cases where the wake up occurred from a received message from the shipboard unit and subsequently the wake up timer 43 occurred. In such cases, it is not apparent at the time of wake up whether or not wake up tasks have to be performed. If no wake up tasks are necessary, it is safe to go to the stand-by mode 290. If, however, after the microcomputer 32 first awakened, a wake up condition from the wake up timer 43 is detected, then it must be determined whether wake up tasks were already executed 288. If so, then it is safe for the microcomputer system to return to the stand-by mode 290. FLAG WU 214 and WAIT RX 220 are called 292, 294 before returning 296 control to the mainline 322. Basically the mainline has a list of all tasks which it must potentially perform in the normal course of operation and it goes through the list to inspect which tasks must be executed. Examples shown in the branch table 328 are to initialize the motor 38, to move the plane 14 to a desired position, to measure the present depth via the sensor 36, to measure the battery voltage, and to perform the wake up related tasks.

There are many tasks which the mainline branch table 328 must perform. One of the more important tasks is the wake up related task 226 of FIG. 5D. The wake up task 226 is performed regularly at 65.5 second intervals as dictated by the wake up timer 43. Several calculations are made by the microcomputer 32 each time and saved. The calculations from the previous iteration through the wake up tasks 226 are saved as previous quantities while current calculations are saved as present quantities. Quantities always saved include previous rate of change of depth, past depth, present depth, and present rate of change of depth. If the micromputer 32 determines the cable leveler 10 has undergone a significant change in gain (i.e., the relative ability to move the cable 12 to another depth) then a new value for gain will be calculated (as detailed earlier) and saved. The perpetual monitoring and adjusting of the cable leveler 10 gain paramater gives the computer system 32 the ability to accurately predict the amount of change in the diving plane 14 position required to cause the cable to go to a desired depth. The diving plane 14 is a hydrofoil and, as it travels through the water it produces a vertical force approximately proportional to the square of the horizontal water velocity. That is, as the velocity doubles, the force producing ability of the diving plane approximately quadruples. Each time a change in the plane angle is made and a resulting significant change in the depth over a unit of time can be observed, this information is stored and used to determine by how much to adjust the plane angle in succeeding attempts to correct for any depth error in the seismic streamer cable. Since the horizontal velocity of the cable 12 is known, and if the mass of the cable 12 is known (that is the mass of the cable section to be moved by the device 10), then an equation could be formulated for a given set of operating conditions by which the plane angle could be adjusted. However, the present invention features an adaptive algorithm to accomplish the adjustment, whereby the previous attempts at moving the seismic streamer cable are used to predict how much plane angle change will be required in the future to affect a proportional change in depth. Another quantity updated each 65.5 seconds is the average depth as dictated by the filter time constant programmed by telemetry from the ship. The depth filter time constant is a time constant which can range typically from a few seconds to many minutes.

The use of a digital time constant filter as implemented in the microcomputer system 32 is an important feature of the invention, and should offer very significant improvement in the recording of digital seismic data. In certain marine seismic operations there are huge swells in the ocean, sometimes lasting for several minutes. In the past, remote cable levelers tended to follow these swells; that is, they would tend to keep the seismic streamer cable at a prescribed depth below the surface of the water. Thus, where it is preferred to position the streamer cable at a prescribed height above the average ocean floor depth, the swells can cause a significant deviation from the true average depth below the water surface. By incorporating a digital time constant which can be programmed from the shipboard unit, the swells can be averaged out and an average depth can be maintained by the cable leveler 10.

There are two primary modes of operation 228. The most common mode is that of a closed loop feedback system whereby the device 10 seeks a prescribed or desired depth. The other mode is for the device 10 to have its diving planes 14 set to a fixed position by command of the shipboard electronics. This second mode is analogous to a full dive or full climb position in prior art cable levelers. Block 228 determines if the planes are set to a fixed angle by command. If so, then control proceeds to subroutine Z 286. If the angle is not fixed by command, then control is in the mode where the preset, prescribed depth, is being sought 230.

If the motor 38 has not already been successfully initialized 232, the motor initialization subroutine MOTINIT 298 is called 234. If the motor 38 was successfully initialized, then the functions in blocks 236 and 238 are executed. Block 236 indicates that the device 10 either (1) can be commanded to use a specific algorithm in determining its plane angle adjustment, or (2) if not so commanded, can automatically select an algorithm by which to make plane angle adjustments based on its previous success in achieving the desired depth. This is very useful in the conditions where changing sea state over the course of time indicates that a different method of achieving a desired depth is necessary from the one presently in use. Block 238 shows the various types of algorithms that are used to achieve a desired depth. The first, proportional control, indicates that the further the system 10 is from the desired depth, the more adjustment that is made to the plane angle to achieve the desired depth. The second, adaptive rate of depth change, indicates that the unit 10 is to use previous history to determine what future adjustments to the plane angles are necessary to achieve the desired depth. The third, integral proportional control, features a higher order adjustment than the simple proportional control. The fourth is an emergency dive to some preset depth. In the emergency dive mode, the system 10 makes adjustments as necessary to achieve the preset depth as quickly as possible. The fifth is an emergency surface, which is analogous to the emergency dive in that the system 10 makes adjustments to the wing angle as quickly as necessary to achieve a surface of the seismic streamer cable.

Refering now to FIG. 5G and Block 316, the diving plane 14 is moved to a new position. If a correct plane position has been achieved 318, then control is returned to the main loop to determine if there are any other mainline tasks 322. However, if the correct plane position was not achieved, then several specific motor error bits are flagged 320. These are reported back to the shipboard system to indicate the source of the problem. The error bits include: (1) a stalled motor 38; (2) that the limit mark 56 was detected by sensor S2 at the wrong time; or (3) the motor 38 never turned enough to allow sensor S1 to detect position marks 54.

The motor initialization subroutine 298 illustrates how the microcomputer 32 in conjunction with the optical sensors S1, S2 and associated sensor board 88 is able to perform initial angular calibration of the diving planes 14. Typically, angular calibration is performed only once. Referring to block 300, the motor 38 is driven so as to detect the limit mark 56. Thereafter position marks 54 are counted by sensor S1 and the microcomputer 32 to determine diving plane angle. Referring to block 302, if the limit mark 56 cannot be detected by sensor S2, then the NEVER SAW LIMIT error flag is set 312 for later telemetry to the ship. If, however, the limit mark 56 can be successfully detected 302, then the diving plane 14 is moved toward a full climb position 304. Block 306 determines the success of positioning the planes 14 to a full climb position. A failure to position the planes 14 results in the setting of the particular motor problem flags for telemetry to the ship 312. Setting the diving planes successfully results in flagging that the motor 38 was initialized 308 and return 310 to the calling block. Flagging that the motor was initialized allows other taks to attempt to position the planes 14.

Figure 5I:
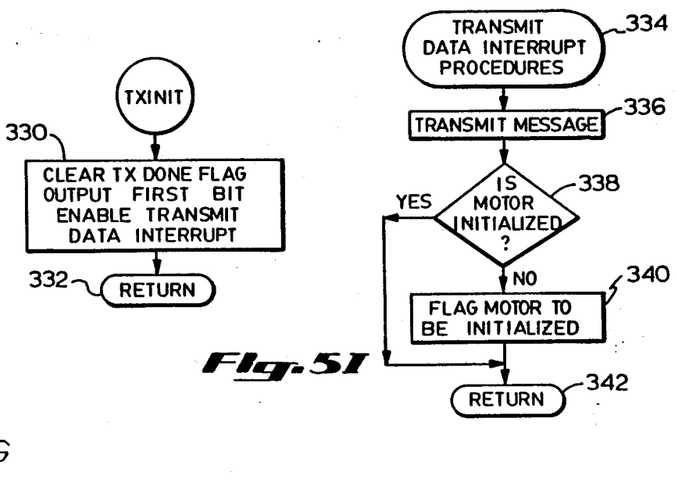

Now referring to FIGS. 5E and 5I, the interrupt tasks are described. The receiver interrupt tasks 240 are invoked by the WAIT RX subroutine 220. It must first be determined if a valid first byte has been received from the ship 244. If not, then a false start bit has been received, typically the result of interference on the transmission line. The FALSE START error flag is set to indicate the false start 246. It is not desirable to wait to receive additional characters so the WAITING ON RX flag is reset 282. Next, it must be determined if any mainline tasks are to be performed 284. If none are to be performed, a test for the presence of a wake up is made 286. If a wake up is not present, the microcomputer 32 goes to the stand-by mode 290. If there are mainline tasks to be performed at block 284, then a call is made 294 to the WAIT RX subroutine 220 before returning 296.

If a good byte was received at block 244, then it must be determined 248 if this is in fact the specific cable leveler 10 being addressed or if all cable levelers 10 are being addressed to accept the command simultaneously. If the command is for this (or all) RU's, then it must be determined if the message is a valid command 252. If at block 248 this is not a command for this RU, then it must be determined if the command is to reprogram the RU ID 250. Thus, valid commands addressed to a specific RU or commands to reprogram the RU result in the flagging of appropriate command tasks for execution 254, while bad command messages cause a branch to block 268. In general, commands directed to a specific cable leveler 10 require that a confirming response be transmitted while commands directed to all cable levelers 10 specifically prohibit the transmission of a response to the ship. Block 256 determines if a transmit message is required. If a transmit message is not required, a delay time is set up to the time of calling the WAIT RX subroutine 258.

To understand the reason for the delays in blocks 258 and 264 it must be understood that message timings are well-defined and rigid. Messages sent from the shipboard unit to the cable leveler 10, last for approximately 90 milliseconds. Then there is a measurement or command processing delay of approximately 20 milliseconds, followed by 90 milliseconds for the cable leveler 10 to respond to the ship. Thus, every 200 milliseconds there is a 90 millisecond window in which transmission from the ship to the cable leveler 10 is active, and there is a 90 millisecond window whereby transmission from the cable leveler 10 back to the ship is active. Therefore, the delay in block 258 is necessary so that while another cable leveler 10 is responding, this cable leveler 10 does not listen to the response, but rather waits until a message from the ship is due. The delay in block 264 is a much shorter delay to the time at which transmission to the ship is expected. After this delay time 264, subroutine TXINIT 330 is called to initialize the interrupt driven transmit tasks. Before the delay time 258 has passed, the WAITING ON RX flag is reset 260 indicating data is not being received. After the delay time of block 258, the WAIT RX subroutine 220 is called, reenabling the receiver tasks. Subroutine TXINIT 330 clears the TX DONE flag to indicate that transmission is in progress. It outputs the first bit of data then enables the Transmit Data Interrupt Procedure 334 to control the data transmission timings to the ship. After transmission of the message 338, it is determined if the motor 38 has been initialized. Typically on power up the motor 38 has not been initialized and the flage MOTOR TO BE INITIALIZED is set and a return 342 is affected. At all other times after the initial power up the motor is found at block 338 to have been initialized and a simple return is affected 342.

Filed herewith and incorporated by reference to the extent necessary to satisfy 35 U.S.C. §112 is a complete source code software listing implementing the above described operation.

Figure 6:
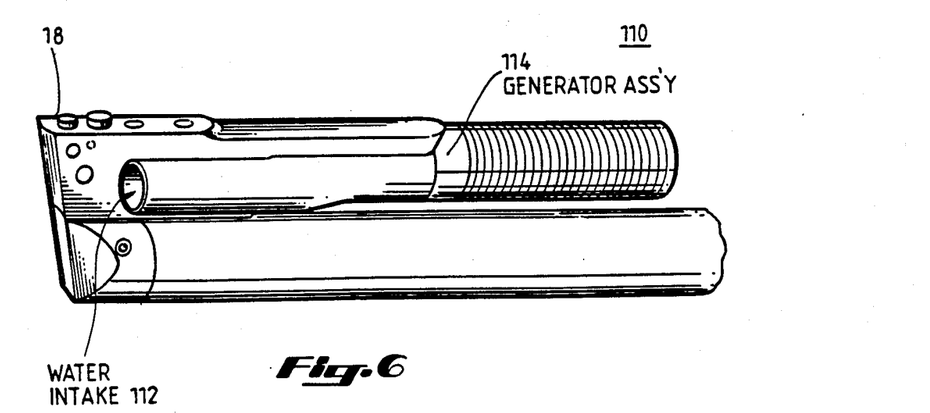

Referring now to FIG. 6, a water-driven generator 110 is provided as an alternative to the power supply housing 24. The water-driven generator 110 includes a pair of water intake tubes 112 which are mounted to straddle the front shank 18. The water intake tubes 112 lead to a generator housing 114. Mounted within the housing 114 is a water-driven propeller which rotates as the cable leveling device 10 is propelled through the water. The propeller has mounted thereon a plurality of magnets. These magnets are inductively coupled to internal windings which are mounted inside a water-tight capsule within the housing 114. Rare earth, cobalt, magnets are suitably employed. As the propeller and its magnets turn, electrical current is induced in the internal windings within the water-tight capsule. This current is then communicated to the analog and digital boards 96, 98.

Although a rather detailed description of a preferred embodiment has been described herein, it is understood that such description has been by way of example only. Various modifications within the spirit and scope of the invention will be apparent to those skilled in the art.

What is claimed is:

1. A remotely controlled depth control unit for a marine seismic cable towed behind a ship, the cable being of the type which receives from the ship depth command signals for transmission to the depth control unit for indicating the desired depth for the cable, comprising:
   (a) a body;
   (b) one or more diving planes moveably connected to the body, the angle of the diving plane with respect to the body controlling the depth of the control unit;

(c) stored program digital computer means responsive to said depth command signals and to stored depth indicative signals for generating angle control signals;

(d) springless moving means responsive to the angle control signals for moving said one or more diving planes to move the control unit to said desired depth;

(e) a depth sensor for providing to a storage means depth indicative signals representative of control unit depth; and (f) storage means for storing the depth indicative signals and providing stored depth indicative signals to the computer means, wherein the digital computer means includes means coupled to the moving means for generating a diving plane angle signal directly proportional to said diving plane angle, a stored program digital processor, and means coupling said diving plane angle signal to said digital processor whereby closed loop feedback control of said diving planes is provided for generating said angle control signals.

2. The control unit according to claim 1, wherein said means for generating the diving plane angle signal is an optic coupler responsive to movement of said moving means.

3. A remotely controlled depth control unit for a marine seismic cable towed behind a ship, the cable being of the type which receives from the ship dept command signals for transmission to the depth control unit for indicating the desired depth for the cable, comprising:

(a) a body;

(b) one or more diving planes moveably connected to the body, the angle of the diving plane with respect to the body controlling the depth of the control unit;

(c) stored program digital computer means responsive to said depth command signals and to stored depth indicative signals for generating angle control signals;

(d) springless moving means responsive to the angle control signals for moving said one or more diving planes to move the control unit to said desired depth, wherein said moving means includes:

(i) a motor, and, (ii) direct mechanical linkage coupling said motor to said diving planes to control movement of said diving planes;

(e) a depth sensor for providing to a storage means depth indicative signals representative of control unit depth; and (f) storage means for storing the depth indicative signals and providing stored depth indicative signals to the computer means.

4. The depth control unit according to claim 3, wherein said motor includes a rotating armature shaft, and wherein said mechanical linkage includes a lead screw and a motor coupler coupling said lead screw to said armature shaft, said lead screw being threadably connected to said coupler such that rotation of said coupler provides longitudinal movement of said lead screw.

5. The control unit according to claim 4, wherein said mechanical linkage further includes:

(a) means for maintaining said shaft in a generally fixed rotational orientation; and, (b) a moment arm assembly coupling said diving plane to said lead screw, whereby said longitudinal movement of said lead screw changes the angle of the diving plane with respect to said body.

6. The control unit according to claim 5, wherein said coupler includes position marks corresponding to the angular orientation of the diving planes with respect to said body.

7. The control unit according to claim 4, wherein said lead screw includes a limit mark corresponding to a predetermiend angular orientation of said diving plane with respect to said body.

8. The depth control unit according to claim 3, wherein said body includes a unitary housing for supporting said motor and said mechanical linkage.

9. A remotely controlled depth control unit for a marine seismic cable towed behind a ship, the cable being of the type which receives from the ship depth command signals for transmission to the depth control unit for indicating the desired depth for the cable, comprising:

(a) a body;

(b) one or more diving planes moveably connected to the body, the angle of the diving plane with respect to the body controlling the depth of the control unit;

(c) stored program digital computer means responsive to said depth command signals and to stored depth indicative signals for generating angle control signals, wherein said stored program computer means includes an adaptive algorithm for generating said angle control signals as a function of the instantaneous lifting ability of said diving plane, and wherein said algorithm operates said processor to generate said angle control signals as a function of stored present depth information, stored past depth information, and stored changes in the diving plane angle which generated said past depth information and said present depth information;

(d) springless moving means responsive to the angle control signals for moving said one or more diving planes to move the control unit to said desired depth;

(e) a depth sensor for providing to a storage means depth indicative signals representative of control unit depth; and (f) storage means for storing the depth indicative signals and providing stored depth indicative signals to the computer means.

10. A remotely controlled depth control unit for a marine seismic cable towed behind a ship, the cable being of the type which receives from the ship depth command signals for transmission to the depth control unit for indicating the desired depth for the cable, comprising:

(a) a body;

(b) one or more diving planes moveable connected to the body, the angle of the diving plane with respect to the body controlling the depth of the control unit;

(c) stored program digital computer means responsive to said depth command signals and to stored depth indicative signals for generating angle control signals wherein said stored program computer means includes an algorithm programmed to average said depth indicative signals to generate average depth signals, and wherein the computer means uses the average depth signals to generate the angle control signals;

(d) springless moving means responsive to the angle control signals for moving said one or more diving planes to move the control unit to said desired depth;

(e) a depth sensor for providing to a storage means depth indicative signals representative of control unit dpeth; and (f) storage means for storing the depth indicative signals and providing stored depth indicative signals to the computer means.

11. For a marine seismic cable, a method of controllng the angle of a diving plane of a leveling device which moves the cable to a desired depth below the water surface, the method comprising the steps of:

(a) sensing and storing the depth of the leveling device at a first point of time; T1;

(b) sensing and storing the angle of the diving plane at said first point of time, T1;

(c) maintaining said angle constant to a second point of time, T2;

(d) sensing and storing the depth of said control unit at the second point of time;

(e) calculating a gain factor corresponding to the amount of the depth change for the stored diving plane angle between the first and second points of time for a given unit of time, wherein said gain factor is directly proportional to the quotient formed by dividing the stored diving plane angle with the rate of said depth change between said points of time T1 and T2;

(f) calculatng an updated gain factor between time T2 and another point of time T3 according to steps (a)-(e) above; and, (g) chasnging said diving plane angle in accordance with said updated gain factor thereby to cause said cable to further move closer to said desired depth.

* * * * *

UNITED STATES PATENT AND TRADEMARK OFFICE
CERTIFICATE OF CORRECTION

PATENT NO. : 4,709,355
DATED : November 24, 1987
INVENTOR(S) : Woods et al.

It is certified that error appears in the above-identified patent and that said Letters Patent are hereby corrected as shown below:

Title page:

Include References Cited:

| U.S. Patent/ Serial No. | Inventor |
|---|---|
| 3,412,704 | Buller et al. |
| 3,541,989 | Leonard |
| 3,605,674 | Weese |
| 3,648,642 | Fetrow et al. |
| 3,673,556 | Biggs |
| 4,290,124 | Cole |
| 501,809 | Woods |

Signed and Sealed this

Sixth Day of September, 1988

Attest:

DONALD J. QUIGG

Attesting Officer

Commissioner of Patents and Trademarks